G. ATTERBURY.
COLLAPSIBLE CORE FOR MOLDING OR CASTING.
APPLICATION FILED SEPT. 10, 1910.
1,086,121.
Patented Feb. 3, 1914.
4 SHEETS—SHEET 2.
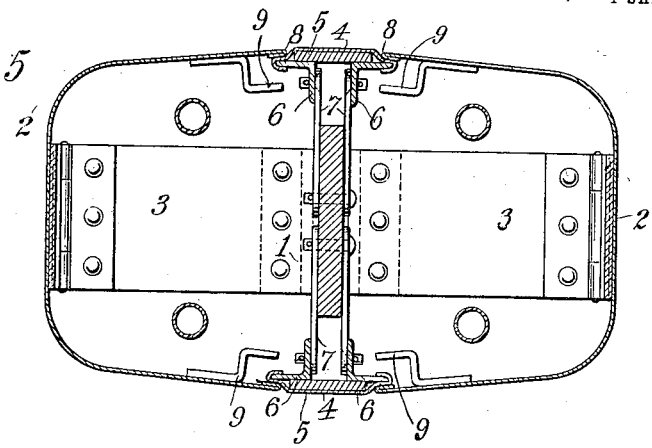
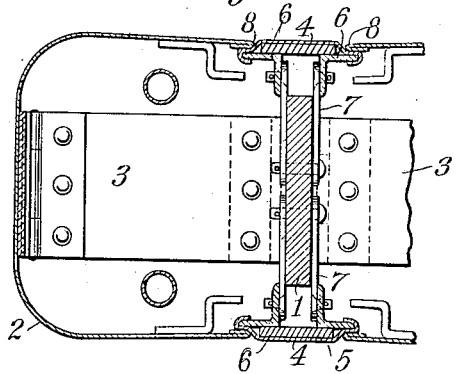
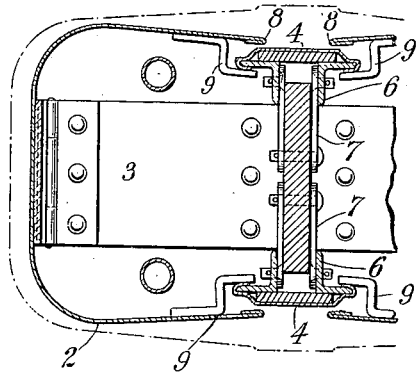
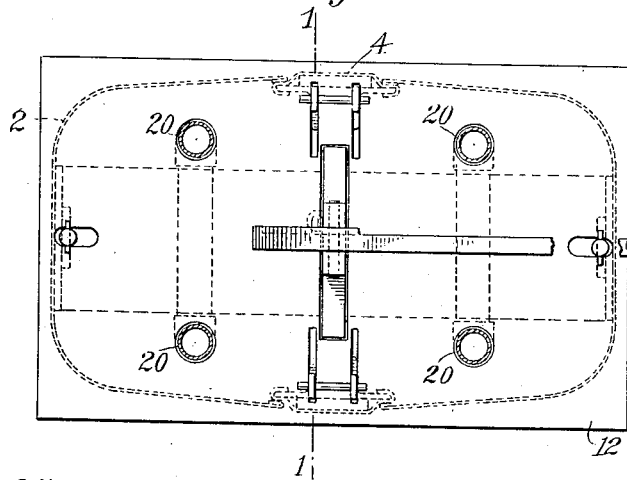
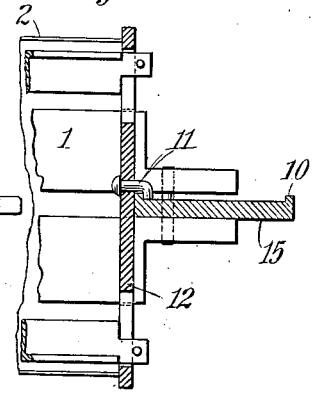
Witnesses:
Grosvenor Atterbury, Inventor G. ATTERBURY.
COLLAPSIBLE CORE FOR MOLDING OR CASTING.
APPLICATION FILED SEPT. 10, 1910.
1,086,121.
Patented Feb. 3, 1914.
4 SHEETS—SHEET 3.
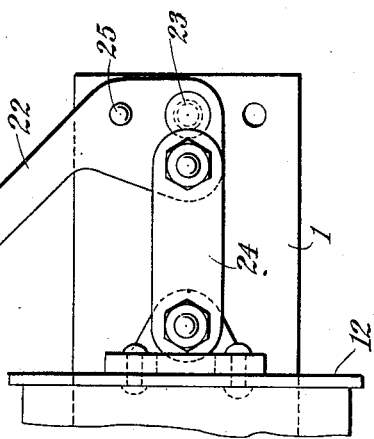
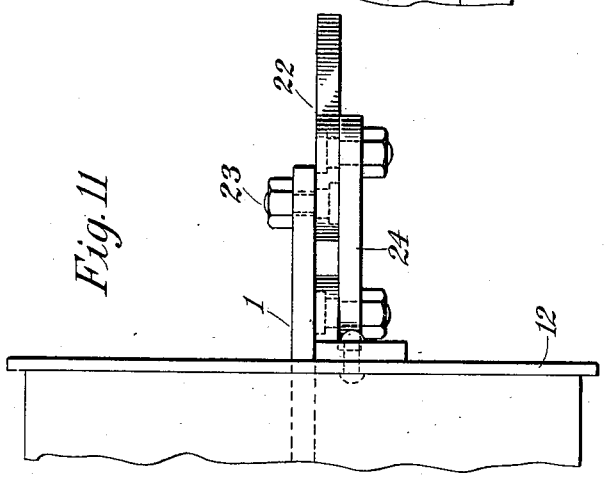
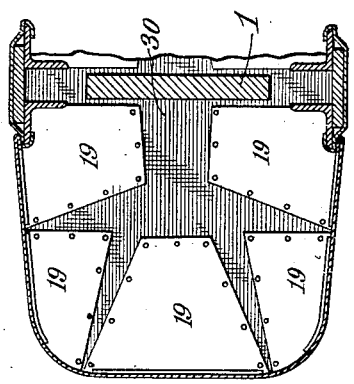
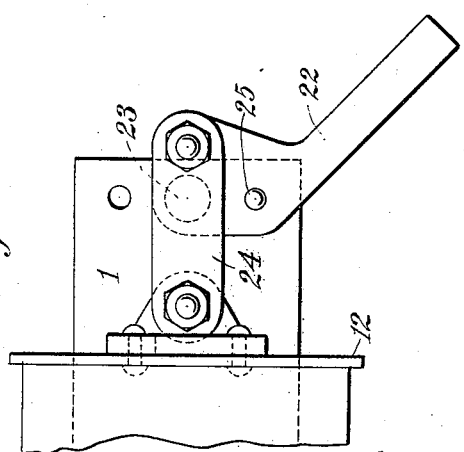
Inventor
Grosvenor Atterbury
By his Attorneys G. ATTERBURY.
COLLAPSIBLE CORE FOR MOLDING OR CASTING.
APPLICATION FILED SEPT. 10, 1910.

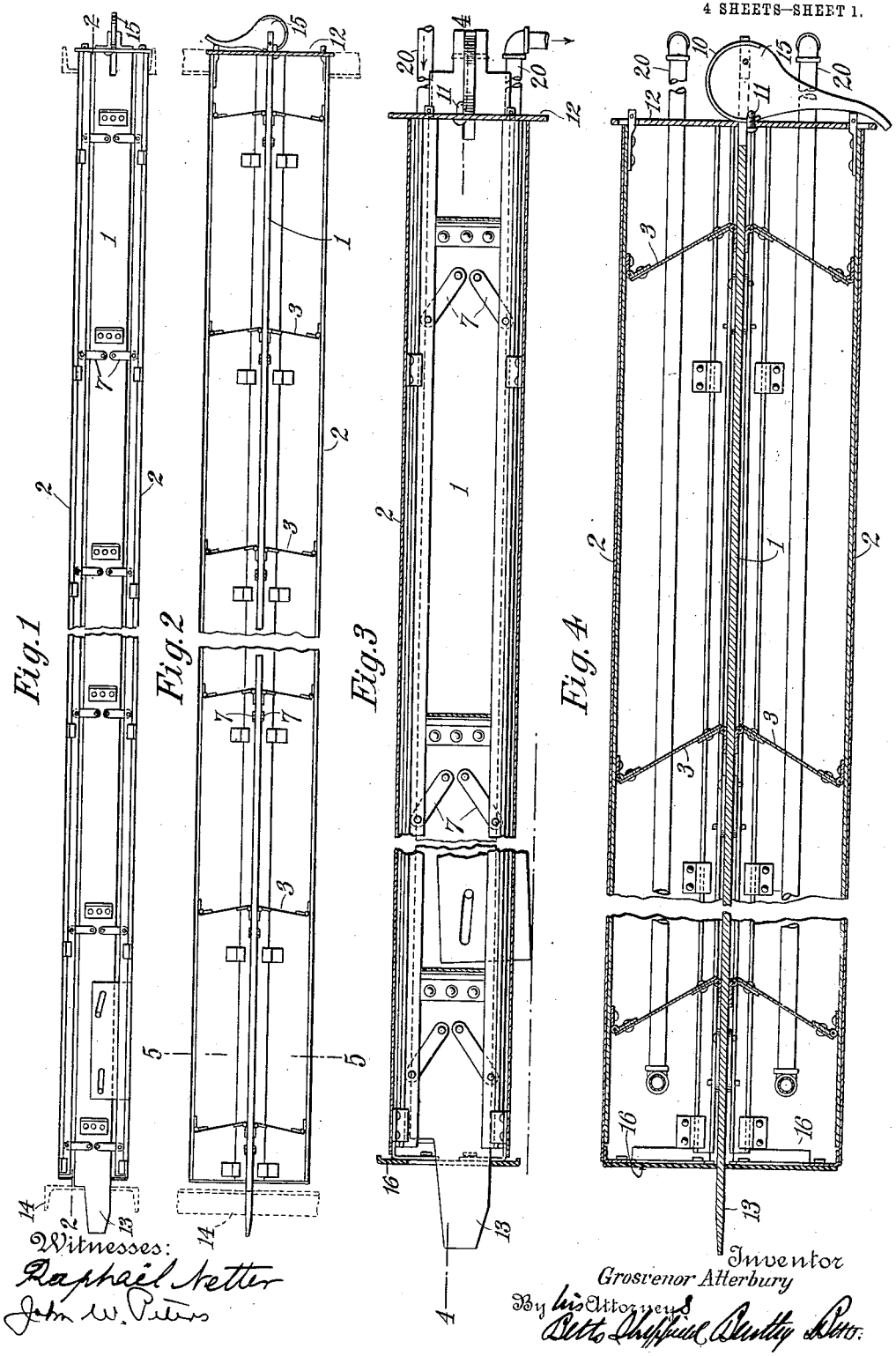

1,086,121.

Patented Feb. 3, 1914.

4 SHEETS—SHEET 4.

Witnesses:

Grosvenor Atterbury, Inventor
By his Attorneys

UNITED STATES PATENT OFFICE.

GROSVENOR ATTERBURY, OF NEW YORK, N. Y.

COLLAPSIBLE CORE FOR MOLDING OR CASTING.

1,086,121.  Specification of Letters Patent.  Patented Feb. 3, 1914.

Application filed September 10, 1910.  Serial No. 581,341.

*To all whom it may concern:*

Be it known that I, GROSVENOR ATTERBURY, a citizen of the United States, and a resident of the borough of Manhattan, city, county, and State of New York, have invented certain new and useful Improvements in Collapsible Cores for Molding or Casting, of which the following is a clear and complete disclosure.

My invention relates to that class of molding apparatus in which the body is cast with a hole or holes formed by means of a suitable core or cores adapted to be withdrawn after the body is formed and has sufficiently hardened to maintain its shape, and it specially relates to such cores used for forming holes or voids in concrete sections or blocks.

The object of my invention is to produce a core which can readily be constructed out of the commercial shapes of iron or steel, and which will be light, simple and cheap in construction and reasonably durable, and which may be easily withdrawn from the body of concrete, or permit the removal of the concrete block from around the core, even when the block has not fully hardened and the core is unusually long, without damaging the concrete or displacing the same.

Other advantages and benefits of my invention will be apparent to those skilled in the art, from the following specification and the accompanying drawings forming a part thereof, in which—

Figure 13:
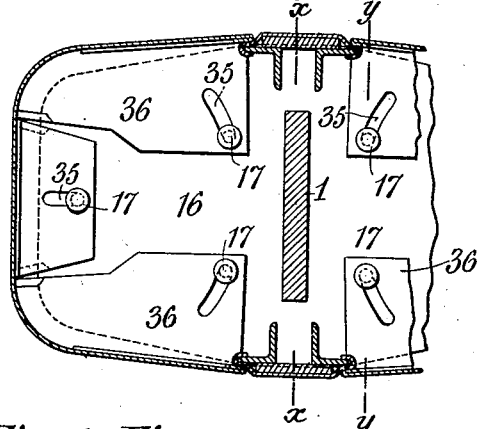
Figure 14:
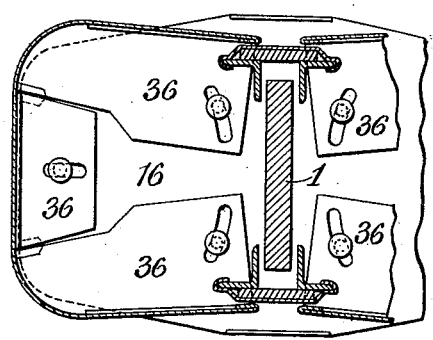
Figures 15, 16, 17:
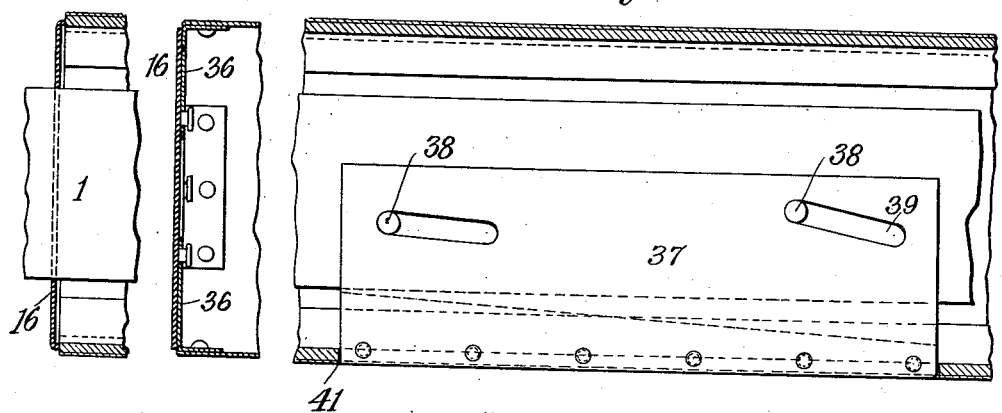
Figure 19:
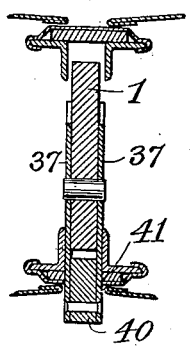
Figure 18:
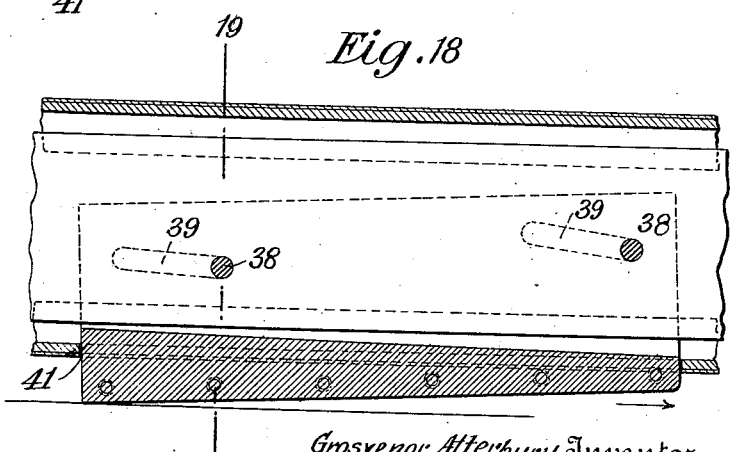

Figure 1 is a longitudinal sectional view of one embodiment of my improved core, showing it expanded. This view is taken on the line 1—1 of the core as shown in Fig. 8, and shows the core in horizontal position with the ends resting on the end walls of a mold box; the latter are shown in dotted lines. Fig. 2 is a longitudinal sectional view of the core taken on the line 2—2 of Fig. 1. Fig. 3 is a longitudinal sectional view similar to Fig. 1, except that the core is shown collapsed or contracted, and steam pipes are shown in position in the core for heating the block. Fig. 4 is a longitudinal sectional view taken on the line 4—4 of Fig. 3, and shows steam pipe in position therein for heating the block. Fig. 5 is a cross-sectional view of the core expanded as shown in Fig. 2, and is taken on line 5—5 of that figure. Fig. 6 is a sectional view showing the sides of the core in the intermediate or normal position. Fig. 7 is a transverse sectional view showing the core collapsed. Fig. 8 is an end view. Fig. 9 is a sectional view showing a transverse section of the cam used for collapsing and expanding the core. Figs. 10, 11 and 12 are detail views of a modified mechanism for collapsing and expanding the cores. Figs. 13 and 14 are detail views showing one arrangement for closing the end of the core away from the operating device. Fig. 15 is a sectional view taken on the line x—x of Fig. 13. Fig. 16 is a sectional view taken on the line y—y of Fig. 13. Figs. 17 and 18 are longitudinal sectional views showing the skid for use in removing the core. Fig. 19 is a sectional view on the line 19—19 of Fig. 18. Fig. 20 illustrates a modified arrangement for closing the end of the core.

The same reference numerals are used throughout to designate the different views of the same parts.

The core is provided with a center piece 1 which extends the full length of the core. This member is shown flat in cross-section and when the core is used horizontally for forming voids in concrete blocks it is disposed edgewise so as to be able to support the weight of the core, or assist in doing so. It is obvious that this member may be built up in box girder form. On each side of this center piece there is a U-shaped side wall or forming plate 2, each connected to the center piece on opposite sides thereof by spacing members 3, each of which is hinged at one end to the center member and at the other to the side walls 2, at or near their center. The members 3 are formed of flat plates and are adapted to prevent any twisting or side motion of the walls 2 with reference to the center member.

The side walls or forming plate 2 are formed of resilient plates so sprung and shaped as to normally take the position shown in Fig. 6, but they may be expanded to the position shown in Fig. 5 or contracted to the position shown in Fig. 7, as hereinafter pointed out.

Filler strips 4 are provided to close the space between the adjacent ends of the side walls 2. These filler strips are formed of plates 5 each having their edges secured to two angle-irons 6. Links or spacing members 7 are pivoted at one end to the angle-irons 6, and at the other end to the flat sides of the center piece. These links are disposed at suitable intervals throughout the length of the core, and the arrangement is such that when the center piece is displaced longitudinally it will cause both the links 7 and the members 3 to act as toggles and contract or expand the side walls of the core.

The links 7 engage the side walls of the core through the filler strips 4 which, when thrust out, are adapted to engage the edge 8 of the core, and when drawn in, are adapted to engage the members 9. Between the edges 8 and the members 9 the filler strips have a certain amount of play or lost motion which permits their withdrawal for a certain distance so that the edges of the sides can slip over the filler strips 4 before the edges are drawn in toward the center, and so prevents the edges of the resilient side walls from binding against the filler strips while the core is being contracted. The spring in the side walls 2 insures a close fit and secure engagement between the side walls and the filler pieces 4 when the core is expanded. It also facilitates the collapsing of the cores.

Secured to one end of the center member 1, there is a cam 15 having a flange 10 in engagement with a pin 11 secured in the end member 12, resting on the end of the core. The arrangement of this cam is such that when it is turned to the position shown in Fig. 2 it forces out the center piece and thrusts out the links 7 and spacing members 3, and expands the core, and when turned into the position shown in Fig. 4 it draws in the links and spacing members and contracts the core.

Instead of the cam actuated opening and closing mechanism shown in Figs. 8 and 9, I may use in connection with my core the modified opening and closing mechanism shown in Figs. 10, 11 and 12. In these figures the center member 1 carries a lever 22 secured thereto by the pivot 23. A link 24 connects the lever with the fixed end of the core 12. A pin 25 is provided and is adapted to hold the member 22 in either the closed position shown in Fig. 10, or in the open position shown in Fig. 12.

It is frequently desirable that the hole in the block should not extend entirely through the block, and in order that this may be made possible I provide means for closing one end of the core so that concrete may rest against the same. End closing mechanism for this purpose is shown in detail in Figs, 13, 14, 15 and 16. Referring to these figures, 16 designates a plate slightly smaller than the end of the core when expanded. It is connected to the core by the pins 17 which slide in the slots 35 in the small plates 36 secured to the side walls of the cores. The arrangement is such that the pins will slide in the slots and allow the core to collapse in the manner shown in Fig. 14. Instead of providing plates adapted to slide over one another as above described, I may provide a series of plates 19 as in Fig. 20 with open spaces between their edges, and close the spaces with canvas 30 secured to the edges of the plates. The canvas allows the end to contract and expand with the sides of the core. In casting large blocks it is frequently desirable to hasten the hardening of the material by the application of steam. In order that this may be done I provide my improved core with a system of steam pipes 20 extending and forming a steam circuit throughout the length of the cores.

The center piece, at the end away from the cam 15 is provided with an extension 13 extending beyond the end of the core and adapted to serve as a positioning means for correctly locating the core while in use. It is shown resting on the wall of a casting frame 14 shown in dotted lines, and the core terminates short of the wall so that the end of the block will be solid. In a core of this kind having thin side walls and an end plate which projects beyond the walls, when the walls are collapsed there is danger of damaging either the block or the core in withdrawing the latter. I overcome this defect by providing a skid, see Figs. 3, 17, 18 and 19, which supports the core after it has been collapsed. This skid comprises two plates 37 secured to the center member 1 on opposite sides by the pins 38 in the inclined slots 39. A filler piece 40 is disposed between the plates at their outer edges and forms the bearing surface for the skid. The skid is disposed in a slot 41 in the filler strip 4 which permits it to move inwardly and outwardly but prevents longitudinal movement. When the center member is adjusted longitudinally the pins in the inclined slots cause the skid to take the inclined position shown in Fig. 18, whereas when the core is expanded and in use it has the position shown in Fig. 17 with its outer edge flush with the surface of the core. When the core is collapsed and withdrawn, the skid rests on the material in the mold or on the bottom of the mold if there be no material and supports the core.

It will be observed that the side walls, the filler strips, the spacing members 3, the links 7 and in fact all of the parts of the core, may be easily made out of commercial forms of iron or steel with very little shaping or special work, and may be easily assembled or disassembled for repair or adjustment.

The flat shape of the center member not only gives the core the rigidity and strength necessary for use in horizontal positions where it is supported only at the ends, but makes it easy to secure the two sets of spacing members, 3 and 7, thereto, and permits the side walls to be easily removed and the core to be easily assembled and taken apart.

The operation of my improved core will readily be understood from the foregoing, and need not be further described. It is obvious that it can be used for other work than that of forming holes or voids in concrete floors and sections, and that it can be used wherever a core for concrete work is desired.

I am aware that other modifications of my improved core may be made by those skilled in the art, without departing from the spirit and scope of my invention, and I desire to secure protection for all such modifications as come within the scope of my claims.

What I claim is:

1. A collapsible core having a longitudinally adjustable center member, flexible side members surrounding said center member and end plates arranged to project beyond the side members when contracted and spacing members each connected at one end to said center member, and at the other end to a side wall and a retractable skid adapted to support said core when collapsed, substantially as described.

2. A collapsible core comprising a plurality of flexible forming plates, a plurality of filler pieces disposed between them and a center member longitudinally disposed in said core, spacing members hinged at one end to said center member and at their other end to said filler pieces, and stops on said forming plates adapted to engage the outer ends of the spacing members only after the filler pieces have been partly withdrawn, substantially as described.

3. The combination in a collapsible core of side walls adapted to be expanded and contracted and end plates arranged to project beyond the side walls when contracted with a skid arranged to project beyond the walls of the core when in the contracted position, and to support the core, substantially as described.

4. A collapsible core comprising retractable side walls, an end wall adapted to expand and contract with said core, and a center member longitudinally disposed in said core and extending beyond one end of said side walls, and adapted to be used as a positioning device, substantially as described.

5. A collapsible core comprising U-shaped flexible side walls, a center member having heat distributing pipes secured thereto, a series of pivoted spacing members extending from the center member to the middle of said U-shaped walls, and secured to each by a hinged joint and a second series of spacing members pivoted to said center member and adapted to draw in and expand the edges of said flexible walls, substantially as described.

GROSVENOR ATTERBURY.

Witnesses:
   FREDERICK W. WAGDELBURG,
   JOSEPH MARSHALL.